United States Patent Office 3,579,627
Patented May 18, 1971

3,579,627
RH₀ BLOOD TESTING SERUM
Zenro Hayakawa, Matsumoto, Japan, assignor to Takeda Chemical Industries, Ltd., Osaka, Japan
No Drawing. Filed Sept. 29, 1967, Ser. No. 671,550
Claims priority, application Japan, Sept. 29, 1966, 41/64,581
Int. Cl. G01n $33/16$
U.S. Cl. 424—11                                    2 Claims

ABSTRACT OF THE DISCLOSURE $Rh_0$ testing serum comprises anti-$Rh_0$ incomplete antibody of human origin and anti-$Rh_0$ complete antibody of animal origin, the Coombs titre and the agglutinin titres being at least about 32 and about 16, respectively, the ratio of Coombs titre to agglutinin titre being from about 1:2 to about 8:1.

---

This invention relates to $Rh_0$ blood testing serum. More particularly, this invention relates to $Rh_0$ blood testing serum which contains anti-$Rh_0$ incomplete antibody—sometimes also referred to as "blocking" antibody—of human origin and anti-$Rh_0$ complete antibody of animal origin.

Since Landsteiner and Wiener discovered a new blood factor in the blood of human beings and designated it as "Rh factor," extensive studies have been carried out to find new blood factors in relation to the Rh factor. As a result, the present Rh blood type system of human beings has been established. There are two typical series of nomenclature of the factors in this Rh blood type system; one is the Wiener nomenclature and the other is the Fisher-Race nomenclature. The relationship between the two series of nomenclature is briefly shown as follows for the practical use of these factors:

| Wiener nomenclature— | Fisher-Race nomenclature |
|---|---|
| Rh+: | |
| $Rh_0$ | D |
| rh' | C |
| rh" | E |
| Rh—: | |
| $Hr_0$ | d |
| hr' | c |
| hr" | e |

However, throughout the present specification and the claims only the Wiener nomenclature is employed.

From the clinical point of view, $Rh_0$ antigen is the most significant among the above cited antigens, because clinical troubles caused by Rh factors are chiefly concerned with this antigen.

Under these circumstances, it is indispensable to determine whether or not $Rh_0$ antigen is present in the red cells in clinical cases liable to invite accidents caused by Rh factors, for example:

(1) Before every transfusion or injection of blood to patients, irrespective of age and sex;
(2) In every pregnancy;
(3) When an infant is born, especially if its mother has such a medical history that one or more of her pregnancies have resulted in some hemolytic diseases of her fetuses or babies, or it is known that her blood contains Rh antibodies, or when there is any clinical ground to suspect that the infant has a hemolytic disease;
(4) When a female in whom $Rh_0$ antibody has already been formed desires a prediction as to whether or not there is any chance that an $Rh_0$ positive infant may be born; or
(5) When $Rh_0$ negative blood donors are to be selected.

At present, the following three types of sera are employed as $Rh_0$ testing sera:

(a) $Rh_0$ testing serum comprising anti-$Rh_0$ complete antibody of human origin;
(b) $Rh_0$ testing serum comprising anti-$Rh_0$ incomplete antibody of human origin; and
(c) $Rh_0$ testing serum comprising anti-$Rh_0$ complete antibody of animal origin.

However, the $Rh_0$ testing serum comprising anti-$Rh_0$ complete antibody of human origin is bound up with the drawback that its production on a commercial scale is very difficult. More concretely, though the antiserum comprising the anti-$Rh_0$ complete antibody of human origin is generally obtained from the blood of volunteers belonging to the $Rh_0$-negative group who are immunized with the antigen-positive human blood cells, the anti-$Rh_0$ complete antibody is produced only just after the immunization. Therefore, the production of the antiserum comprising such anti-$Rh_0$ complete antibody is very difficult.

Furthermore, though it is possible with the use of said antiserum comprising the anti-$Rh_0$ complete antibody of human origin to determine whether or not $Rh_0$ antigen per se is present in the red cells of a subject, it is impossible with the use of the same to determine whether or not such antigen as $^O(D^u)$ antigen (which is a variant type of $Rh_0$ antigen) or $Rh_0III$ antigen (which is a partial antigen of $Rh_0$ antigen) is present in the red cells.

On the other hand, as the $Rh_0$ testing procedure which involves employment of $Rh_0$ testing serum comprising anti-$Rh_0$ incomplete antibody of human origin, the Coombs test in which the said antiserum and Coombs serum are employed is most preferably employed, since the Coombs test is necessary for clearly determining whether or not $^O$ antigen as well as $Rh_0$ antigen is present in the red cells of a subject, but also can be carried out with use of a red cell suspension in a physiological saline.

However, the said Coombs test is accompanied by such drawbacks that it involves not only the employment of a large amount of Coombs serum but rather troublesome techniques. Therefore, it is almost impossible to apply this test to all subjects to be tested.

Under these circumstances, the following test procedure has been proposed and is widely employed in such contries as Japan, as the most practical and economical $Rh_0$ testing system:

(a) A red cell suspension in a physiological saline is firstly tested with the use of an $Rh_0$ testing serum comprising anti-$Rh_0$ complete antibody of animal origin. A subject whose red cells are positive to the said test is determined as "normal $Rh_0+$ having $Rh_0$ III antigen."
(b) Red cell suspensions which show negative or vague reaction to the above-mentioned test are subsequently subjected to the Coombs test employing both $Rh_0$ testing serum comprising anti-$Rh_0$ incomplete antibody of human origin and the Coombs serum. A subject whose red cells are positive to this Coombs test is determined as "$Rh_0+$ which lacks $Rh_0$ III antigen" or "$^O$" and a subject whose red cells are negative is determined as "$Rh_0$ —."

However, in the said $Rh_0$ testing procedure the trouble is that it is indispensable to employ two kinds of $Rh_0$ testing serum, i.e. $Rh_0$ testing serum comprising anti-$Rh_0$ complete antibody of animal origin in the first step and $Rh_0$ testing serum comprising anti-$Rh_0$ incomplete antibody of human origin in the second step. When it is taken into consideration that such $Rh_0$ testing procedure is carried out in rather small medical practitioners' offices, the Biological Preparations" pp. 193 to 195. The maximum dilution of the diluted $Rh_0$ testing serum, red cell suspension treated thereby showing agglutination with the Coombs serum is termed the "Coombs titre."

serum which comprises anti-$Rh_0$ complete antibody (agglutinin titre 32). The result of the agglutination reaction between $Rh_0$ positive red cells and the resultant mixtures is summarized in Table 1:

TABLE 1

| Dilution of the human serum | Times | | | | | | | | |
|---|---|---|---|---|---|---|---|---|---|
|  | 2 | 3 | 6 | 12 | 24 | 48 | 96 | 192 | 384 |
| Type of $Rh_0$ positive red cells: | | | | | | | | | |
| A—$R_1R_2$ | ++++ | ++++ | ++++ | ++++ | ++++ | ++++ | ++++ | ++++ | ++++ |
| B—$R_1R_2$ | ++++ | ++++ | ++++ | ++++ | ++++ | ++++ | ++++ | ++++ | ++++ |
| O—$R_1r$ | ++++ | ++++ | ++++ | ++++ | ++++ | ++++ | ++++ | ++++ | ++++ |

See notes following Table 3.

From the viewpoint of practical use of the $Rh_0$ testing serum in the $Rh_0$ testing procedure, it is especially advantageous to admix anti-$Rh_0$ incomplete antibody of human origin with anti-$Rh_0$ complete antibody of animal origin so that the Coombs titre of the resultant $Rh_0$ testing serum is in the range from about 32 to about 128 and the agglutinin titre of the same in the range from about 16 to about 64.

However, as the $Rh_0$ testing serum of the present invention can be employed in the $Rh_0$ testing procedure after being diluted with a suitable diluent such as a physiological saline as far as the resultant diluted serum has the Coombs titre not less than about 32 and the agglutinin titre not less than about 16, the anti-$Rh_0$ incomplete antibody of human origin may be admixed with the anti-$Rh_0$ complete antibody of animal origin so as to make the Coombs titre more than about 128 and the agglutinin titre more than about 64. In this case, from the practical point of view in the use of the $Rh_0$ testing serum in the testing procedure, it is most advantageous to admix the anti-$Rh_0$ incomplete antibody of human origin with the anti-$Rh_0$ complete antibody of animal origin, in a such ratio that the Coombs titre of the resultant $Rh_0$ testing serum is about 1:2 to about 8:1 relative to the agglutinin titre of the same.

Thus-prepared $Rh_0$ testing serum of the present invention can be used in both the first step and the second step (the Coombs test) in the said $Rh_0$ testing procedure. For example, (1) The first step: Red cell suspensions in a physiological saline are tested with the use of only the $Rh_0$ testing serum of the present invention, whereby the anti-$Rh_0$ complete antibody contained in the serum agglutinates the normal $Rh_0$+red cells, but does not agglutinate $Rh_0$+red cells which lack $Rh_0$III antigen.

(2) The second step: Red cell suspensions which show negative or vague reaction to the first test are directly subjected to the Coombs test with the use of the Coombs serum and without using further anti-$Rh_0$ incomplete antibody of human origin, whereby the anti-$Rh_0$ incomplete antibody in the present $Rh_0$ testing serum contained in the suspension agglutinates $Rh_0$+red cells which lack $Rh_0$ III antigen, $^o$ red cells, or $Rh_0$+red cells of weak antigen.

RUN 1

Human serum comprising anti-$Rh_0$ incomplete antibody (Coombs titre 1280) is diluted 2, 3, 6, 12, 24, 48, 96, 192, and 384 times with a physiological saline. To each diluted solution is added the equal volume of guinea-pig As clearly shown in Table 1, the anti-$Rh_0$ incomplete antibody of human origin never blocks the agglutination of $Rh_0$ positive red cells with the anti-$Rh_0$ complete antibody of the animal origin.

RUN 2

(a) A human serum comprising anti-$Rh_0$ incomplete antibody is diluted 10 times with a 30% aqueous human albumin solution. The Coombs titre of the ten-fold diluted serum is measured to give the result shown in Table 2, from which the titre is determined as 128.

TABLE 2

| Dilution with physiological saline: | Agglutination |
|---|---|
| Not diluted | ++++ |
| 2 times | +++ |
| 4 times | +++ |
| 8 times | +++ |
| 16 times | ++ |
| 32 times | ++ |
| 64 times | ++ |
| 128 times | + |
| 256 times | — |

(b) The same human serum comprising anti-$Rh_0$ incomplete antibody as employed in (a) is diluted 10, 20, 40 or 80 times with guinea-pig serum which comprises anti-$Rh_0$ complete antibody of the agglutinin titre 16.

The Coombs titre of each resultant mixture is measured to give the result shown in Table 3.

TABLE 3

| Dilution of the serum mixtures with a physiological solution | Not diluted | Times | | | | | | | |
|---|---|---|---|---|---|---|---|---|---|
|  |  | 2 | 3 | 8 | 16 | 32 | 64 | 128 | 256 |
| The human serum=guinea pig serum by volume ratio: | | | | | | | | | |
| 1=10 | +++ | +++ | +++ | +++ | +++ | +++ | +++ | +++ | +++ |
| 1=20 | +++ | +++ | +++ | +++ | +++ | +++ | ++ | ++ | ++ |
| 1=40 | +++ | +++ | +++ | ++ | ++ | ++ | + | + | — |
| 1=80 | +++ | +++ | +++ | ++ | ++ | + | — | — | — |

NOTES TO TABLES 1, 2 AND 3

—Completely negative
+Very slightly agglutinated
++Slight agglutinated
+++Moderately agglutinated
++++Strongly agglutinated (All are macroscopical observations.)

Comparison of Table 3 with Table 2 shows clearly that the human serum comprising anti-$Rh_0$ incomplete antibody exhibits the same Coombs titre when diluted 10 times with the 30% aqueous human albumin solution and when diluted 40 times with the guinea-pig serum comprising anti-$Rh_0$ complete antibody. This means that the Coombs titre of human incomplete antibody is enhanced about four times by the guinea-pig serum comprising anti-$Rh_0$ complete antibody.

EXAMPLE 1

39 parts by volume of an $Rh_0$ testing serum comprising anti-$Rh_0$ complete antibody of guinea-pig origin, which is

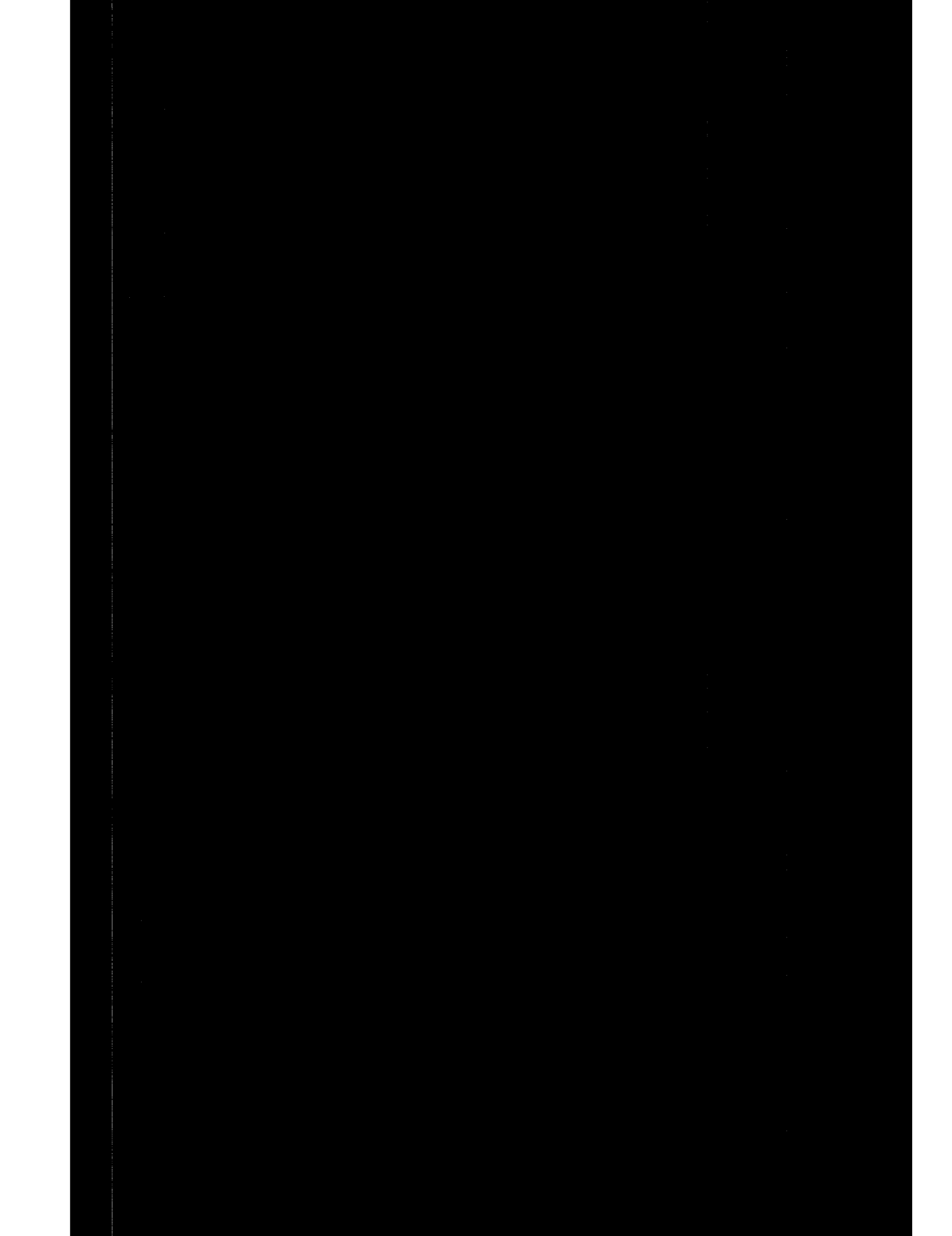

UNITED STATES PATENT OFFICE
CERTIFICATE OF CORRECTION

Patent No. 3,579,627          Dated May 18, 1971

Inventor(s)          ZENRO HAYAKAWA

It is certified that error appears in the above-identified patent and that said Letters Patent are hereby corrected as shown below:

In Claim 1, the phrase "incomplete antibody of human origin and anti-$Rh_o$" has been omitted between lines 1 and 2 of the claim.

Signed and sealed this 22nd day of February 1972.

(SEAL)
Attest:

EDWARD M. FLETCHER, JR.          ROBERT GOTTSCHALK
Attesting Officer                 Commissioner of Patents